(12) United States Patent
Sato et al.

(10) Patent No.: US 10,300,746 B2
(45) Date of Patent: May 28, 2019

(54) PNEUMATIC TIRE

(71) Applicant: The Yokohama Rubber Co., LTD., Minato-ku, Tokyo (JP)

(72) Inventors: Toshiyuki Sato, Hiratsuka (JP); Shoei Kakuta, Hiratsuka (JP); Hideki Hamanaka, Hiratsuka (JP); Yukihito Yamaguchi, Hiratsuka (JP); Risa Tauchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/520,805

(22) PCT Filed: Oct. 5, 2015

(86) PCT No.: PCT/JP2015/078162
§ 371 (c)(1),
(2) Date: Apr. 20, 2017

(87) PCT Pub. No.: WO2016/063713
PCT Pub. Date: Apr. 28, 2016

(65) Prior Publication Data
US 2018/0001714 A1    Jan. 4, 2018

(30) Foreign Application Priority Data

Oct. 20, 2014 (JP) .................................. 2014-213679
May 13, 2015 (JP) ..................... PCT/JP2015/063719

(51) Int. Cl.
*B60C 11/11* (2006.01)
*B60C 11/13* (2006.01)
*B60C 11/03* (2006.01)

(52) U.S. Cl.
CPC ....... *B60C 11/1353* (2013.01); *B60C 11/0311* (2013.01); *B60C 11/0316* (2013.01);
(Continued)

(58) Field of Classification Search
CPC ............. B60C 11/0311; B60C 11/0316; B60C 11/1369
See application file for complete search history.

(56) References Cited

U.S. PATENT DOCUMENTS

D457,128 S  *  5/2002 Robert ......................... D12/579
2007/0199633 A1 *  8/2007 Hayashi .............. B60C 11/0311
                                                            152/209.18
(Continued)

FOREIGN PATENT DOCUMENTS

GB         1487958 A  * 10/1977
JP       H09-136514          5/1997
(Continued)

OTHER PUBLICATIONS machine translation for Japan 2012-179948 (Year: 2018).*
(Continued)

*Primary Examiner* — Steven D Maki
(74) *Attorney, Agent, or Firm* — Thorpe North & Western

(57) ABSTRACT

A pneumatic tire includes center lug grooves disposed at intervals in a tire circumferential direction that extend crossing a tire equator line and include a first groove turning portion and a second groove turning portion; shoulder lug grooves disposed in the intervals between the center lug grooves in the tire circumferential direction extending outward in the tire width direction, an inner end in the tire width direction being disposed outward of an end of the center lug groove in the tire width direction; a pair of circumferential main grooves to which the ends of the center lug grooves and the inner ends of the shoulder lug grooves in the tire width direction alternately connect; and a circumferential secondary groove disposed around the entire circumference
(Continued)

of the pneumatic tire that intersects the center lug grooves between the first groove turning portion and the second groove turning portion.

14 Claims, 7 Drawing Sheets

(52) U.S. Cl.
CPC .......... *B60C 11/11* (2013.01); *B60C 11/1369* (2013.01); *B60C 2011/0344* (2013.01); *B60C 2011/0346* (2013.01); *B60C 2011/0353* (2013.01); *B60C 2011/0355* (2013.01); *B60C 2011/0372* (2013.01); *B60C 2011/1361* (2013.01); *B60C 2200/06* (2013.01)

(56) References Cited

U.S. PATENT DOCUMENTS

| | | | |
|---|---|---|---|
| 2008/0078488 A1* | 4/2008 | Yoda | B60C 11/0311 152/209.26 |
| 2009/0032157 A1* | 2/2009 | Inoue | B60C 11/0311 152/209.8 |
| 2017/0210179 A1* | 7/2017 | Motomitsu | B60C 11/13 |
| 2017/0240000 A1* | 8/2017 | Manabe | B60C 11/11 |

FOREIGN PATENT DOCUMENTS

| | | | |
|---|---|---|---|
| JP | 2004-098914 | | 4/2004 |
| JP | 2004-224131 | | 8/2004 |
| JP | 2004-262295 A | * | 9/2004 |
| JP | 2006-151083 | | 6/2006 |
| JP | 2007-191093 | | 8/2007 |
| JP | 2008-279976 | | 11/2008 |
| JP | 2010-125999 | | 6/2010 |
| JP | 2010-125999 A | * | 6/2010 |
| JP | 2012-179948 A | * | 9/2012 |
| WO | WO 2006/001202 | | 1/2006 |
| WO | WO 2006/057169 | | 6/2006 |

OTHER PUBLICATIONS machine translation for 2010-125999 (Year: 2018).*
machine translation for Japan 2004-262295 (Year: 2018).*
International Search Report for International Application No. PCT/JP2015/078162 dated Nov. 2, 2015, 4 pages, Japan.

* cited by examiner

PNEUMATIC TIRE

TECHNICAL FIELD

The present technology relates to a pneumatic tire with a tread pattern.

BACKGROUND ART

There is currently a demand for pneumatic tires to be improved in various performance areas. Such improvement may be realized through the design of tread patterns. Heavy duty tires have been provided with a tread pattern designed with improved traction performance in mind.

For example, a heavy duty pneumatic tire is known which improves both traction characteristics on bad roads until the terminal stage of wear and wet performance at high-speeds in a compatible manner (see Japanese Unexamined Patent Application Publication No. H09-136514A). This heavy duty pneumatic tire includes a tread provided with at least one circumferential main groove extending in the circumferential direction, and a plurality of lateral grooves disposed on opposite sides of the circumferential main groove at intervals in the circumferential direction. The plurality of lateral grooves are connected to the circumferential main groove. The circumferential main groove extend in the circumferential direction in a tread central region that corresponds to 50% of the ground contact width. The groove depth of the circumferential main groove is 5% or greater of the ground contact width. The lateral grooves provided in at least the regions on opposite sides of the tread have a groove depth 109% or greater the groove depth of the circumferential main groove.

In this heavy duty pneumatic tire, the area of the tread center region is made large so as to increase the cut resistance performance and wear resistance performance. However, a large tread center region land portion area leads to an increase in the amount of heat build-up, and a small groove area leads to the amount of heat dissipated decreasing. As a result, heat build-up resistance is reduced. Also, increasing the groove area to increase heat build-up resistance results in stones becoming more likely to lodge in the grooves.

SUMMARY

The present technology provides a heavy duty pneumatic tire capable of improved heat build-up resistance in the tread center region land portion while suppressing a reduction in stone rejecting characteristics.

An aspect of the present technology is a pneumatic tire including a tread portion provided with a tread pattern.

The tread pattern includes a plurality of center lug grooves disposed at intervals in a tire circumferential direction that extend crossing a tire equator line. The plurality of center lug grooves each include a first groove turning portion that turns with a bent shape or a curved shape and a first end, the first groove turning portion and the first end being located in a half-tread region that is on a first side of the tire equator line in a tire width direction, and a second groove turning portion that turns with a bent shape or a curved shape and a second end, the second groove turning portion and the second end being located in a half-tread region on a second side in the tire width direction. The tread pattern further includes a plurality of shoulder lug grooves disposed in the intervals in the tire circumferential direction between the plurality of center lug grooves in both of the half-tread regions that extend outward in the tire width direction. The plurality of shoulder lug grooves each include an outer end in the tire width direction that opens to a ground contact edge on each of opposite sides in the tire width direction, and an inner end in the tire width direction located on an outside of a position in the tire width direction of the respective first end or the second end in the tire width direction. The tread pattern further includes a pair of circumferential main grooves disposed in the respective half-tread regions that extend around an entire circumference of the pneumatic tire in a wave-like shape with a groove width less than that of the plurality of shoulder lug grooves. The pair of circumferential main grooves alternately connect the respective first ends or second ends and the inner ends of each of the plurality of shoulder lug grooves in the tire width direction. The tread pattern further includes a plurality of center blocks arranged in the tire circumferential direction and defined by the plurality of center lug grooves and the pair of circumferential main grooves, and a plurality of shoulder blocks arranged in the tire circumferential direction and defined by the plurality of shoulder lug grooves and the pair of circumferential main grooves. The tread pattern further includes a circumferential secondary groove disposed around the entire circumference of the pneumatic tire that intersects the plurality of center lug grooves between the first groove turning portion and the second groove turning portion. Relationships $0.50 \leq P4/P3 \leq 1.00$ and $0.015 \leq P4/WB \leq 0.045$ are satisfied, where P3 is a groove width of the plurality of center lug grooves, P4 is a groove width of the circumferential secondary groove, and WB is a maximum width of the plurality of center blocks in the tire width direction.

A raised bottom portion is preferably provided in each of the pair of circumferential main grooves where groove depth becomes partially shallower.

A relationship $D2/T<0.05$ is preferably satisfied, where D2 is a groove depth of the raised bottom portion and T is a ground contact width of the tread portion in the tire width direction.

A relationship $0.45 \leq D4/D3 \leq 0.85$ is preferably satisfied, where D3 is a maximum groove depth of the plurality of center lug grooves and D4 is a maximum groove depth of the circumferential secondary groove.

A relationship $0.10 \leq B/WB \leq 0.50$ is preferably satisfied, where B is a maximum distance in the tire width direction between the first groove turning portion and the second groove turning portion.

Corner portions with an obtuse angle are preferably formed in the plurality of center blocks corresponding to the pair of circumferential main grooves.

A groove width P3 of the plurality of center lug grooves and a groove width P4 of the circumferential secondary groove preferably range from 7 mm to 20 mm.

The heavy duty pneumatic tire can be applied to a construction vehicle or an industrial vehicle.

Preferably, the first groove turning portion disposed on the first side bends or curves protruding out toward a third side in the tire circumferential direction and the second groove turning portion disposed on the second side bends or curves protruding out toward a fourth side opposite the third side in the tire circumferential direction. An inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the plurality of center lug grooves, the straight lines following center positions in a groove width direction of the center lug groove.

According to the tire described above, heat build-up resistance can be improved in a land portion located in a tread center region while suppressing a reduction in stone rejecting characteristics.

DETAILED DESCRIPTION

A pneumatic tire according to embodiments of the present technology is described below in detail with reference to the accompanying drawings.

In the present specification, "tire radial direction" refers to the direction of the tire rotation center axis. "Outward in the tire width direction" refers to the direction away from the tire equator line in the tire width direction relative to the object of comparison. "Inward in the tire width direction" refers to the direction toward the tire equator line in the tire width direction relative to the object of comparison. "Tire circumferential direction" refers to the direction of rotation of the rotating surface of the tread surface that rotates about the center axis of rotation of the tire when the tire rotates. "Tire radial direction" refers to the direction extending radially out from the center axis of rotation of the tire. "Outward in the tire radial direction" refers to the direction away from the center axis of rotation of the tire relative to the object of comparison. "Inward in the tire radial direction" refers to the direction towards the center axis of rotation of the tire relative to the object of comparison.

"Heavy duty tire" in the present specification includes tires for vehicle type 1 (dump truck, scraper), type 2 (grader), type 3 (shovel loader, etc.), type 4 (tire roller), and a mobile crane (truck crane, wheel crane) as specified according to the Japan Automobile Tyre Manufacturers Association, Inc. (JATMA) Year Book 2014, Chapter D, and tire for vehicles as specified according to Tire and Rim Association, Inc. (TRA) Year Book 2013, Section 4 and Section 6. The heavy duty pneumatic tire according to the present embodiment, may be mounted on a construction vehicle or an industrial vehicle, for example. Examples of construction vehicles and industrial vehicles include a dump truck, scraper, grader, shovel loader, tire roller, wheel crane, truck crane, as well as a compactor, earth mover, grader, loader, and dozer.

Figure 1:
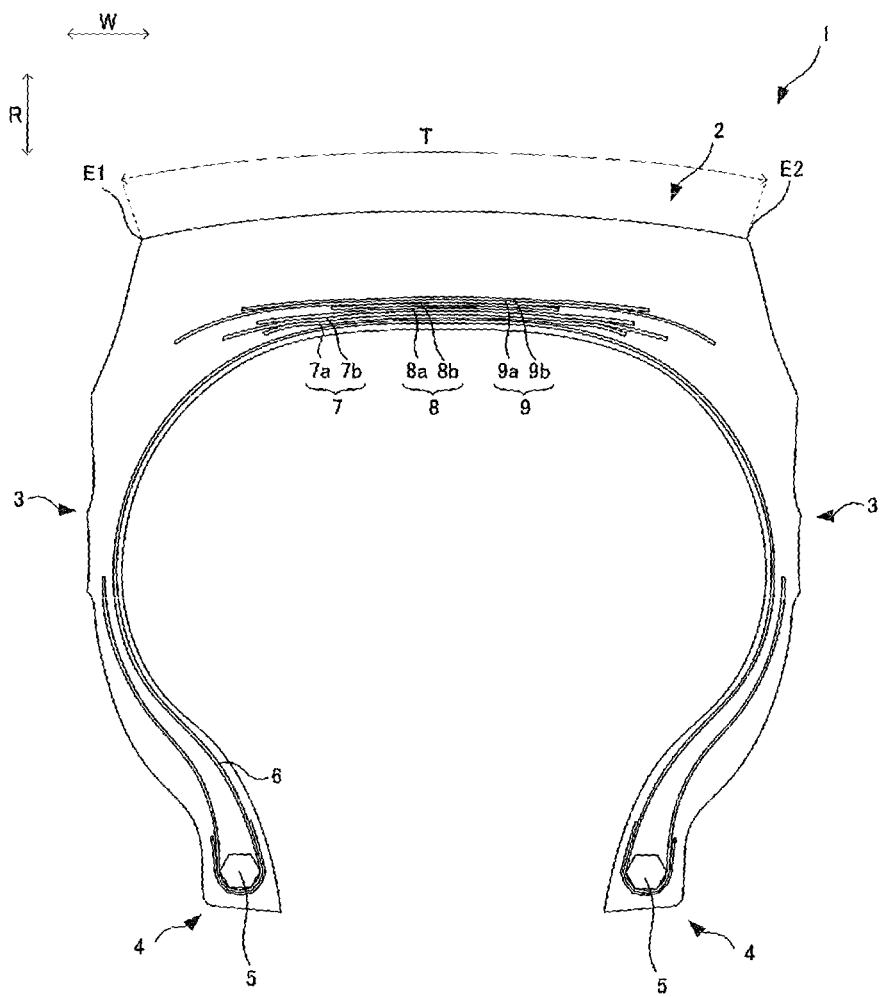
FIG. 1 is a cross-sectional view of an example of a pneumatic radial tire according to the present embodiment.

FIG. 1 is a cross-sectional view of the pneumatic radial tire of the present embodiment (referred to simply as "tire" below) along a plane that passes through the tire rotation axis. In FIG. 1, the tire radial direction is denoted by R and the tire width direction is denoted by W. Note that in FIG. 1, the grooves are omitted.

A tire 1 illustrated in FIG. 1 includes a tread portion 2, a pair of sidewall portions 3, a pair of bead portions 4, and internally includes bead cores 5, a carcass layer 6, and cross belt layers 7, 8, 9.

The pair of bead portions 4 are provided on opposite sides in the tire width direction inward in the tire radial direction. The sidewall portions 3 are disposed outward of the bead portions 4 in the tire radial direction. The sidewall portions 3 are connected in the tire width direction by the tread portion 2 at positions outward in the tire radial direction.

The pair of bead cores 5 are provided inside the bead portions 4. The carcass layer 6 is mounted between the pair of bead cores 5, running from the bead portions 4 to the sidewall portions 3 and then the tread portion 2. The carcass layer 6 is turned up at both end portions at the bead cores 5 from inward in the tire width direction to outward in the tire width direction.

In the tread portion 2, on the outer periphery side of the carcass layer 6, a first cross belt layer 7, a second cross belt layer 8, and a third cross belt layer 9 are disposed in that order from inward to outward in the tire radial direction. The first cross belt layer 7 is made of two belts 7a, 7b. The second cross belt layer 8 is made of two belts 8a, 8b. The third cross belt layer 9 is made of two belts 9a, 9b. Each belt 7a, 7b, 8a, 8b, 9a, 9b includes reinforcing cords inclined with respect to the tire circumferential direction. The inclination angle of the reinforcing cords with respect to the tire circumferential direction is preferably from 18 degrees to 24 degrees.

The first cross belt layer 7 illustrated in FIG. 1 has a configuration in which the belt 7a is located inward in the tire radial direction and the belt 7b is located outward of the belt 7a in the tire radial direction. The width of the belt 7a in the tire width direction is less than the width of the belt 7b in the tire width direction. The reinforcing cords of the belt 7a and belt 7b are inclined in opposition direction with respect to the tire circumferential direction so that the directions of the reinforcing cords intersect.

The second cross belt layer 8 illustrated in FIG. 1 has a configuration in which the belt 8a is located inward in the tire radial direction and the belt 8b is located outward of the belt 8a in the tire radial direction. The width of the belt 8a in the tire width direction is greater than the width of the belt 8b in the tire width direction. The reinforcing cords of the belt 8a and belt 8b are inclined in opposite directions with respect to the tire circumferential direction so that the directions of the reinforcing cords intersect.

The third cross belt layer 9 illustrated in FIG. 1 has a configuration in which the belt 9a is located inward in the tire radial direction and the belt 9b is located outward of the belt 9a in the tire radial direction. The width of the belt 9a in the tire width direction is greater than the width of the belt 9b in the tire width direction. The reinforcing cords of the belt 9a and belt 9b are inclined in opposition directions with respect to the tire circumferential direction so that the directions of the reinforcing cords intersect.

The configuration including the belts 7a, 7b, 8a, 8b, 9a, 9b illustrated in FIG. 1 is one possible example. The widths of the belts 7a, 7b, 8a, 8b, 9a, 9b are not particularly limited. Three cross belt layers 7, 8, 9 are illustrated in FIG. 1, however in some embodiments only two cross belt layers may be provided, and the configuration of the cross belt layers are not particularly limited. Additionally, a sheet-like cushioning material (a rubber layer, for example) may be provided in sections between the belts 7a, 7b, 8a, 8b, 9a, 9b.

A single or a plurality of rubber layers that compose the tread portion 2 are disposed outward of the first cross belt layer 7, the second cross belt layer 8, and the third cross belt layer 9 in the tire radial direction. The rubber of the outermost portion of the tread portion 2 in the tire radial direction has a ratio (tan δ) of loss modulus to storage modulus at 60° C. preferably ranging from 0.04 to 0.2.

Figure 2:
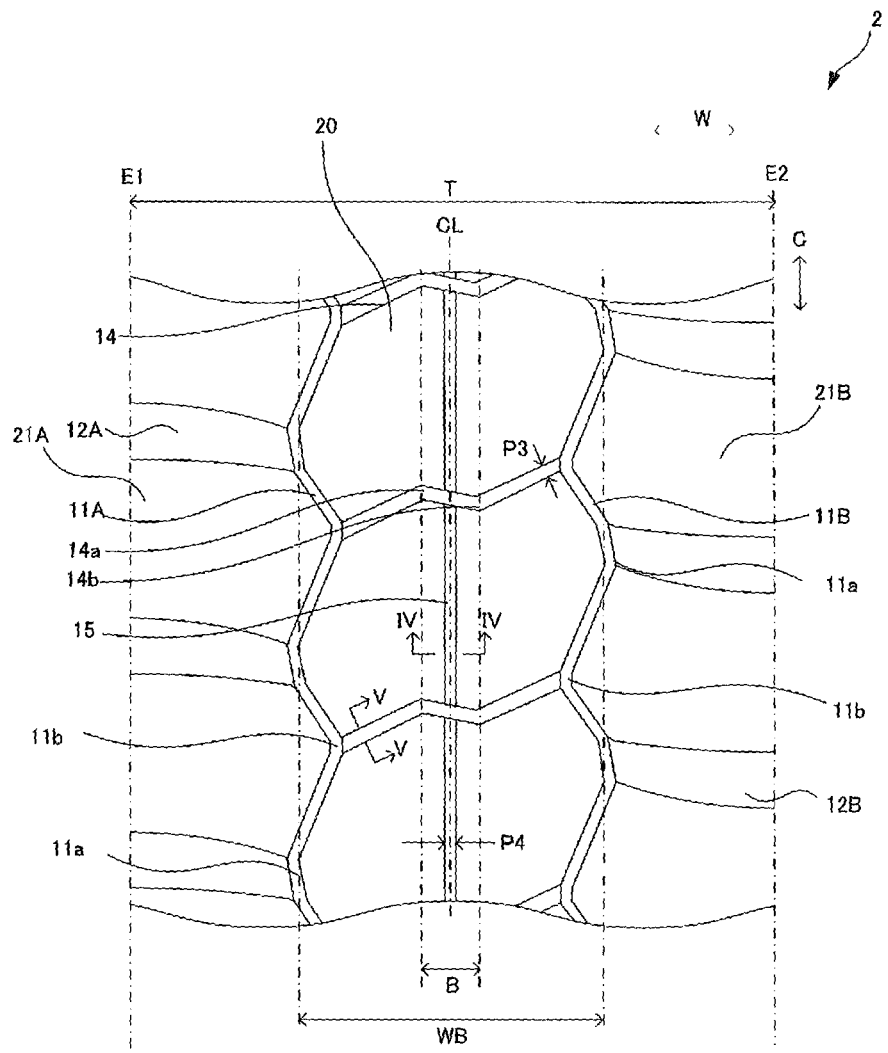
FIG. 2 is a developed plan view illustrating a tread pattern provided on a tread portion of the tire according to the present embodiment.

Such a configuration is but one possible example of the tire 1 and other known configuration may be employed.
Tread Pattern FIG. 2 is a developed plan view illustrating a tread pattern provided on the tread portion 2 of the tire 1 according to the present embodiment. In FIG. 2, the tire circumferential direction is denoted by C and the tire width direction is denoted by W.

The tread portion 2 is provided with a tread pattern that includes a pair of circumferential main grooves 11A, 11B, a plurality of shoulder lug grooves 12A, 12B, a plurality of center lug grooves 14, and a circumferential secondary groove 15. A plurality of center block 20 defined by the pair of circumferential main grooves 11A, 11B and the center lug grooves 14 are formed in a row in the tire circumferential direction. Additionally, a plurality of shoulder blocks 21A defined by the circumferential main groove 11A and the shoulder lug grooves 12A are formed in a row in the tire circumferential direction, and a plurality of shoulder blocks 21B defined by the circumferential main groove 11B and the shoulder lug grooves 12B are formed in a row in the tire circumferential direction. Note that in the present embodiment, the tread pattern of the tread portion 2 has point symmetry with respect to a point of intersection between any center lug groove 14 and the tire equator line CL.
Center Lug Groove A plurality of the center lug grooves 14 are disposed at intervals in the tire circumferential direction. The center lug grooves 14 cross the tire equator line CL and extend in the half-tread regions of opposite sides of the tire equator line CL in the tire width direction to two ends. The center lug grooves 14 connect the circumferential main groove 11A disposed in one of the half-tread regions (the half-tread region from the tire equator line CL to one of the ground contact edges E1) and the circumferential main groove 11B disposed in the other half-tread region (the half-tread region from the tire equator line CL to the other ground contact edge E2). In other words, the center lug grooves 14 each include an end that connects to the circumferential main groove 11A in one half-tread region and an end that connects to the circumferential main groove 11B in the other half-tread region.

The ground contact edges E1, E2 are points of intersection between the extension line of the external form of the tread portion 2 and the extension line of the external form of the sidewall portion 3. In embodiments in which the portions where the tread portion 2 and the sidewall portion 3 connect are not rounded, the portions where the external forms of the tread portion 2 and the sidewall portion 3 connect correspond to ground contact edges E1, E2, as illustrated in FIG. 1. A ground contact width T is the distance between the ground contact edges E1, E2.

Between a first end connected to the circumferential main groove 11A and a second end connected to the circumferential main groove 11B, the center lug groove 14 includes a first groove turning portion 14a and a second groove turning portion 14b with a bent shape or a curved shape. The first groove turning portion 14a is preferably provided on the side (first side) of the tire equator line where the circumferential main groove 11A is disposed, and the second groove turning portion 14b is preferably provided on the side (second side) of the tire equator line where the circumferential main groove 11B is disposed. Note that in the present embodiment, the center lug groove 14 intersects the tire equator line between the first groove turning portion 14a and the second groove turning portion 14b. However, the center lug groove 14 may not intersect the tire equator line between the first groove turning portion 14a and the second groove turning portion 14b.

At the groove turning portions 14a, 14b, the center lug groove 14 may bend to form an angled shape or by turn to form a rounded curved shape. An angled shape includes a shape that bends at a predetermined radius of curvature. Additionally, the portions of the center lug groove 14 other than the groove turning portions 14a, 14b may have a rectilinear shape or a curved shape. In embodiments in which the groove turning portions 14a, 14b and the portions other than the groove turning portions 14a, 14b have a curved shape, the curved shapes may have the same radius of curvature. Additionally, one of two groove turning portions 14a, 14b may have a bent shaped connection portion formed by a rectilinear groove and a curved groove connecting, and the other may have a curved shaped connection portion.

Figure 3:
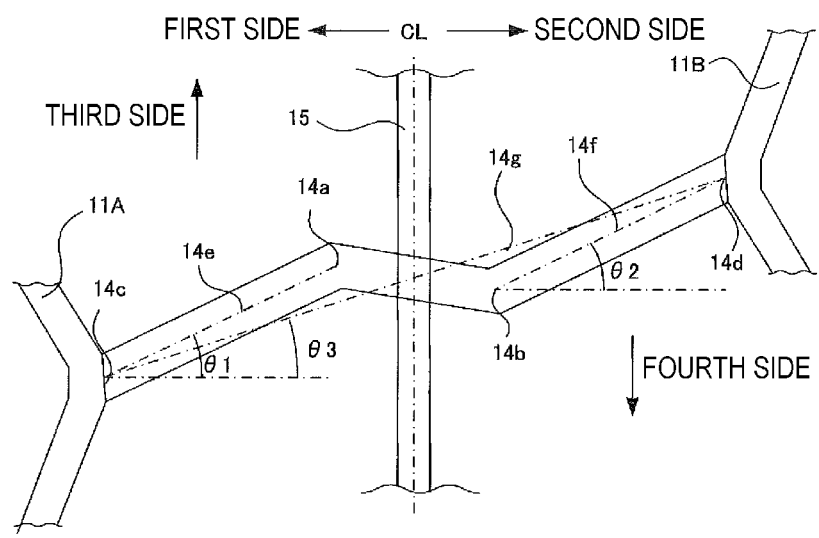
FIG. 3 is an enlarged view of a center lug groove.

FIG. 3 is an enlarged view of the center lug groove 14. As illustrated in FIG. 3, the circumferential secondary groove 15 intersects the center lug groove 14 between the first groove turning portion 14a and the second groove turning portion 14b. In the present embodiment, the end portion of the center lug groove 14 on the side of the circumferential main groove 11A (first side) is defined as first end 14c, the end portion on the side of the circumferential main groove 11B (second side) is defined as second end 14d, the straight line that joins the center position of the first end 14c in the groove width direction and the center position of the first groove turning portion 14a in the groove width direction is defined as first straight line 14e, the straight line that joins the center position of the second end 14d in the groove width direction and the center position of the second groove turning portion 14b in the groove width direction is defined as second straight line 14f, and the straight line that joins the center position of the first end 14c in the groove width direction and the center position of the second end 14d in the groove width direction is defined as third straight line 14g.

Note that in embodiments in which the first groove turning portion 14a has a curved shape, the straight line that joins the center position in the groove width direction of a protruding end of the first groove turning portion 14a that protrudes in the tire circumferential direction and the center position of the first end 14c in the groove width direction is defined as first straight line 14e. In embodiments in which the second groove turning portion 14b has a curved shape, the straight line that joins the center position in the groove width direction of a protruding end of the second groove turning portion 14b that protrudes in the tire circumferential direction and the center position of the second end 14d in the groove width direction is defined as second straight line 14f.

The inclination angle of the first straight line 14e with respect to the tire circumferential direction and the inclination angle of the second straight line 14f with respect to the tire circumferential direction preferably ranges from 55° to 75°. In other words, the inclination angle θ1 (0°≤θ1≤90°) of the first straight line 14e with respect to the tire width direction and the inclination angle $\theta 2$ ($0°\leq\theta 2\leq 90°$) of the second straight line 14f with respect to the tire width direction preferably range from 15° to 35°.

Note that the position of the first end 14c and the position of second end 14d are preferably offset from each other in the tire circumferential direction, and the center lug groove 14 is preferably inclined with respect to the tire equator line CL. The direction in the tire circumferential direction in which the second end 14d is located relative to the first end 14c is defined as the third side, and the direction in the tire circumferential direction in which the first end 14c is located relative to the second end 14d is defined as the fourth side. The third side is the upper side in FIG. 3 and the fourth side is the lower side. The first groove turning portion 14a is preferably located on the third side relative to the third straight line 14g, and the second groove turning portion 14b is preferably located on the fourth side relative to the third straight line 14g. In other words, relationships $\theta 1>\theta 3$ and $\theta 2>\theta 3$ are preferably satisfied, where $\theta 3$ ($0°\leq\theta 3\leq 90°$) is an inclination angle of the third straight line with respect to the tire width direction. $\theta 3$ preferably ranges from 5° to 25°.

The groove width P3 of the center lug grooves 14 preferably ranges from 7 mm to 20 mm.

The first groove turning portion 14a on the side (first side) of the tire equator line where the circumferential main groove 11A is disposed preferably bends or curves so as to protrude in the upward direction of FIG. 2 (the third side in the tire circumferential direction). The second groove turning portion 14b on the side (second side) of the tire equator line where the circumferential main groove 11B is disposed preferably bends or curves so as to protrude toward the fourth side opposite the third side in the tire circumferential direction.

In the present embodiment, by providing the center lug grooves 14 with the first groove turning portion 14a and the second groove turning portion 14b, tread rigidity of the center blocks 20 can be increased.

In other words, when the center blocks 20 separate from the road surface and are kicked back and when the center blocks 20 experience collapse deformation caused by shear force in the tire circumferential direction acting on the center blocks 20 due to the interaction with the road surface, center blocks 20 adjacent in the circumferential direction interlock at the groove turning portions 14a, 14b of the center lug grooves 14 and function integrally to produce a counter force. As a result, tread rigidity of the center blocks 20 can be increased. By increasing tread rigidity of the center blocks 20, the center blocks 20 can be prevented from collapsing. Thus localized wear in the center blocks 20 on opposite sides in the tire circumferential direction of the center lug groove 14 can be suppressed.

Preferably, a relationship $0.10\leq B/WB\leq 0.50$ is satisfied, and more preferably $0.20\leq B/WB\leq 0.40$ is satisfied, where B is the maximum distance in the tire width direction between the first groove turning portion 14a and the second groove turning portion 14b, and WB is the maximum width in the tire width direction of the center block. By setting B/WB is 0.50 or less, tread rigidity of the center blocks 20 can be further increased. If B/WB is less than 0.10, the distance between the groove turning portions 14a, 14b and the circumferential secondary groove 15 shortens, and when the tire makes contact with the ground, the center lug grooves 14 open widely near the groove turning portions 14a, 14b. As a result, stone rejecting performance is decreased.

Circumferential Secondary Groove

The circumferential secondary groove 15 extends annularly in the tire circumferential direction along the tire equator line CL. The circumferential secondary groove 15 intersects the center lug groove 14 at a position between the first groove turning portion 14a and the second groove turning portion 14b. "Between the first groove turning portion 14a and the second groove turning portion 14b" includes both ends in its meaning. In other words, the circumferential secondary groove 15 may intersect the center lug groove 14 at the position of the first groove turning portion 14a or may intersect the center lug groove 14 at the position of the second groove turning portion 14b. By providing the circumferential secondary groove 15 at this position, heat resistance of the central portion of the center block 20 which is most susceptible to heat build-up can be increased.

By disposing the circumferential secondary groove 15 around the entire circumference of the tire, air in the circumferential secondary groove 15 can flow in the tire circumferential direction. As a result, the center blocks 20 can be efficiently cooled and heat resistance can be increased.

Preferably, a relationship $0.015\leq P4/WB\leq 0.045$ is satisfied, and more preferably $0.025\leq P4/WB\leq 0.035$ is satisfied, where P4 is the groove width of the circumferential secondary groove 15, and WB is the maximum width of the center block 20 in the tire width direction.

Note that in the present embodiment, because the circumferential main grooves 11A, 11B described below are disposed around the entire circumference of the tire with a wave-like shape, the ratio WB/T of the maximum width WB of the center block 20 in the tire width direction to the ground contact width T is a relatively large value ranging from 0.35 to 0.55. Even with such a large center block 20, because the relationship $0.015\leq P4/WB\leq 0.045$ is satisfied, a reduction in stone rejecting characteristics by the circumferential secondary groove 15 can be suppressed.

Specifically, the groove width P4 of the circumferential secondary groove 15 preferably ranges from 7 mm to 20 mm.

Additionally, a ratio P4/P3 of the groove width P4 of the circumferential secondary groove 15 to the groove width P3 of the center lug groove 14 preferably satisfies the relationship $0.50\leq P4/P3\leq 1.00$, and more preferably satisfies the relationship $0.65\leq P4/P3\leq 0.85$. By setting P4/P3 in the range described above, air can flow efficiently between the center lug grooves 14 and the circumferential secondary groove 15 to promote cooling. As a result, heat resistance can be increased.

A relationship $0.45\leq D4/D3\leq 0.85$ is preferably satisfied, and more preferably $0.55\leq D4/D3\leq 0.75$ is satisfied, where D3 is the maximum groove depth of the center lug groove 14, and D4 is the maximum groove depth of the circumferential secondary groove 15. If D4/D3 is less than 0.45, air cannot flow efficiently between the center lug grooves 14 and the circumferential secondary groove 15. As a result, heat build-up resistance decreases. If D4/D3 is greater than 0.85, stones become likely to enter the center lug grooves 14. As a result, stone rejecting performance decreases.

Shoulder Lug Groove

The shoulder lug grooves 12A, 12B are disposed in the intervals between the center lug grooves 14 in the tire circumferential direction. The shoulder lug groove 12A, in one of the half-tread regions, extends outward in the tire width direction and in one direction in the tire rotation direction C (upward in FIG. 2) and opens to the ground contact edge E1. The shoulder lug groove 12B, in the other half-tread region, extends outward in the tire width direction and the other direction in the tire rotation direction C (downward in FIG. 2) and opens to the ground contact edge E2.

The position of the end portion of the shoulder lug groove 12A on the side of the circumferential main groove 11A and the end portion on the side of the ground contact edge E1 may be offset from each other in the tire circumferential direction. In other words, the shoulder lug groove 12A may be inclined with respect to the tire equator line CL. In the present embodiment, the inclination angle of the shoulder lug groove 12A with respect to the tire equator line CL ranges from 75° to 88°. "Inclination angle of the shoulder lug groove 12A with respect to the tire equator line CL" refers to the angle formed by the straight line that joins opposite end portions of the shoulder lug groove 12A that follows center positions in the groove width direction and the tire equator line CL.

In a similar manner, the position of the end portion of the shoulder lug groove 12B on the side of the circumferential main groove 11B and the end portion on the side of the ground contact edge E2 may be offset from each other in the tire circumferential direction. In other words, the shoulder lug groove 12B may be inclined with respect to the tire equator line CL. In the present embodiment, the inclination angle of the shoulder lug groove 12B with respect to the tire equator line CL ranges from 75° to 88°. "Inclination angle of the shoulder lug groove 12B with respect to the tire equator line CL" refers to the angle formed by the straight line that joins opposite end portions of the shoulder lug groove 12B that follows center positions in the groove width direction and the tire equator line CL.

The position in the tire width direction of the inward ends of the shoulder lug grooves 12A, 12B in the tire width direction are located outward from the positions in the tire width direction of the ends of the center lug groove 14 in the tire width direction.

The shoulder lug grooves 12A, 12B have a wider groove width than the center lug grooves 14.

Note that the groove width of the shoulder lug grooves 12A, 12B may vary in the tire width direction. For example, the groove width of the shoulder lug grooves 12A, 12B at the inner end portions in the tire width direction may be less than the groove width at the end portions on the side of the ground contact edges. By the groove width of the shoulder lug grooves 12A, 12B widening from the inner end portion in the tire width direction to the end portion on the side of the ground contact edge, water drainage performance from the inner side in the tire width direction to the ground contact edge can be increased.

Circumferential Main Groove

In the half-tread region on the first side (the half-tread region between the tire equator line CL and the ground contact edge E1), the circumferential main groove 11A extends around the entire circumference of the tire in wave-like shape with the first end of the center lug groove 14 and the inner end of the shoulder lug groove 12A in the tire width direction connecting to the circumferential main groove 11A at alternating positions.

In the half-tread region on the second side (the half-tread region between the tire equator line CL and the ground contact edge E2), the circumferential main groove 11B extends around the entire circumference of the tire in wave-like shape with the second end of the center lug groove 14 and the inner end of the shoulder lug groove 12B in the tire width direction connecting to the circumferential main groove 11B at alternating positions.

Here, the circumferential main grooves 11A, 11B having a "wave-like shape" refers to sinuous shape in which the circumferential main grooves 11A, 11B change position in the tire width direction as they extend in the circumferential direction.

The circumferential main groove 11A extends around the entire circumference of the tire in a wave-like shape with connection portions 11a where the circumferential main groove 11A and the inner end of the shoulder lug groove 12A in the tire width direction are connected and connection portions 11b where the circumferential main groove 11A and the first end of the center lug groove 14 are connected being disposed in an alternating arrangement in the tire circumferential direction. By providing the connection portion 11a, the circumferential main groove 11A turns protruding outward in the tire width direction with a bent shape or a curved shape. By providing the connection portion 11b, the circumferential main groove 11A turns protruding inward in the tire width direction with a bent shape or a curved shape.

The circumferential main groove 11B extends around the entire circumference of the tire in a wave-like shape with connection portions 11a where the circumferential main groove 11B and the inner end of the shoulder lug groove 12B in the tire width direction are connected and connection portions 11b where the circumferential main groove 11B and the second end of the center lug groove 14 are connected being disposed in an alternating arrangement in the tire circumferential direction. By providing the connection portion 11a, the circumferential main groove 11B turns protruding outward in the tire width direction with a bent shape or a curved shape. By providing the connection portion 11b, the circumferential main groove 11B turns protruding inward in the tire width direction with a bent shape or a curved shape.

The circumferential main grooves 11A, 11B may have an angled shape at the connection portions 11a, 11b or may have a rounded curved shape. An angled shape includes a shape that bends at a predetermined radius of curvature. Additionally, the portions of the circumferential main grooves 11A, 11B other than the connection portions 11a, 11b may have a rectilinear shape or a curved shape. In embodiments in which the connection portions 11a, 11b and the portions other than the connection portions 11a, 11b have a curved shape, the curved shapes may have the same radius of curvature. Additionally, one of two connection portions 11a, 11b adjacent in the tire circumferential direction may be a bent shaped connection portion formed by a connected rectilinear shaped groove and curved shaped groove and the other may be a curved shaped connection portion.

The circumferential main grooves 11A, 11B have a narrower groove width than the shoulder lug grooves 12A, 12B. The width of the circumferential main grooves 11A, 11B preferably ranges from 7 mm to 20 mm, for example.

The position of the connection portion 11a of the circumferential main groove 11A in the tire circumferential direction is offset from the position of the connection portion 11a of the circumferential main groove 11B in the tire circumferential direction. In other words, the connection portion 11a of the circumferential main groove 11A and the connection portion 11a of the circumferential main groove 11B have an alternating arrangement in the tire circumferential direction.

In a similar manner, the position of the connection portion 11b of the circumferential main groove 11A in the tire circumferential direction is offset from the position of the connection portion 11b of the circumferential main groove 11B in the tire circumferential direction. In other words, the connection portion 11b of the circumferential main groove 11A and the connection portion 11b of the circumferential main groove 11B have an alternating arrangement in the tire circumferential direction.

Accordingly, the wave-like shape of the circumferential main groove 11A and the wave-like shape of the circumferential main groove 11B have substantially identical wavelengths but are out of phase.

Additionally, the circumferential main grooves 11A, 11B are preferably provided with a raised bottom portion 11c which is a portion where the groove depth is shallow.

Figure 6:
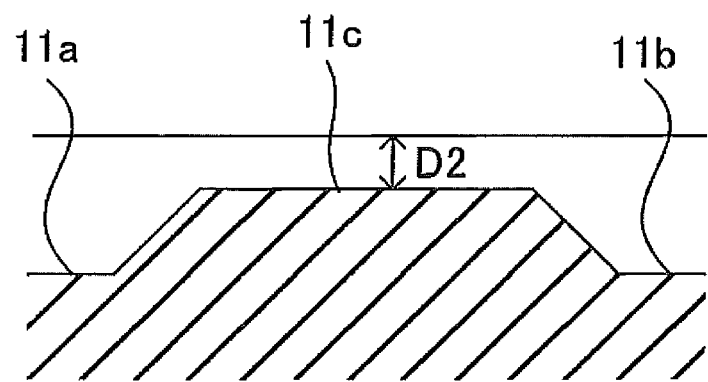
FIG. 6 is a view illustrating an example of a raised bottom portion in a circumferential main groove of the tire according to the present embodiment.

FIG. 6 is a cross-sectional view of an example of the circumferential main groove 11A provided with the raised bottom portion 11c illustrating the region between the connection portion 11a and the connection portion 11b. Note that in a similar manner, the circumferential main groove 11B may also be provided with the raised bottom portion 11c. As illustrated in FIG. 6, the raised bottom portion 11c is provided between the connection portion 11a and the connection portion 11b. In FIG. 6, the depth of the circumferential main grooves 11A, 11B is at a maximum at the connection portion 11a and the connection portion 11b. The depth of the raised bottom portion 11c is less than that of the connection portion 11a and the connection portion 11b. The depth of the circumferential main grooves 11A, 11B at the deepest portion is preferably the same as that of the shoulder lug grooves 12A, 12B.

By providing the raised bottom portion 11c in the circumferential main grooves 11A, 11B, rigidity of a shoulder block 21A surrounded by the shoulder lug grooves 12A and the circumferential main groove 11A, center blocks 20, and a shoulder block 21B surrounded by the shoulder lug grooves 12B and the circumferential main groove 11B is increased. As a result, the amount of deformation of the shoulder block 21A, center blocks 20, and the shoulder lug block 21B decreases, and thus the amount of heat produced due to deformation can be reduced. Additionally, by providing the raised bottom portion 11c, the area of the bottom surface of the circumferential main grooves 11A, 11B increases and the contact area where the air flows along the circumferential main grooves 11A, 11B increases. As a result, heat dissipation performance can be increased.

Note that the connection portion 11a and the connection portion 11b may also be provided with the raised bottom portion 11c. In such embodiments, the depth of the raised bottom portion 11c may be less than the groove depth of the shoulder lug grooves 12. Additionally, the deepest groove depth of the circumferential main grooves is preferably the same as the groove depth of the shoulder lug grooves 12.

The depth of the raised bottom portion 11c may be uniform, or the depth may vary within a range that does not go below the depth of the deepest groove depth. For example, in one embodiment, the raised bottom portion 11c may become shallower in a stepwise manner from the deepest depth portion of the circumferential main grooves 11A, 11B. In another embodiment, the raised bottom portion 11c may continuously become shallower from the deepest depth portion.

In such embodiments, a relationship $D2/T<0.05$ is preferably satisfied, where D2 is the shallowest groove depth of the raised bottom portion 11c. If D2/T is equal to or greater than 0.05, the effect of the raised bottom portion 11c of suppressing the amount of deformation cannot be sufficiently obtained. D2/T is preferably greater than 0.02 to ensure breathability of the circumferential main grooves 11A, 11B.

Center Block

The corner portions of the center blocks 20 at the connection portions 11a, 11b preferably have an obtuse angle. In other words, the bend angle of the circumferential main groove 11A or the circumferential main groove 11B at the connection portion 11a and the angle formed by the circumferential main groove 11A or the circumferential main groove 11B at the connection portion 11b and the center lug groove 14 are preferably obtuse. By the corner portions of the center blocks 20 having an obtuse angle, sufficient rigidity in the corner portions of the center blocks 20 can be obtained. As a result, elastic deformation of the corner portions of the center blocks 20 can be suppressed, and thus heat build-up caused by such elastic deformation can be suppressed.

Additionally, by the bend angle at the connection portion 11b being obtuse, sufficient rigidity in the corner portions of the shoulder blocks 21A, 21B located outward of the connection portions 11b in the tire width direction can be obtained. As a result, elastic deformation of the corner portions of the shoulder blocks 21A, 21B can be suppressed, and thus heat build-up caused by such elastic deformation can be suppressed.

In the tire including the tread pattern according to the present embodiment described above, by providing the center lug grooves 14 with the first groove turning portion 14a and the second groove turning portion 14b, tread rigidity of the center blocks 20 can be increased.

Additionally, by the circumferential secondary groove 15 being disposed around the entire circumference of the tire with a wave-like shape, rigidity of the center blocks 20 and wear resistance can be maintained and heat resistance can be increased.

Furthermore, by providing the circumferential secondary groove 15 with turning portions, tread rigidity of the center blocks 20 can be increased.

Additionally, by setting the ratio P4/WB of the groove width P4 of the circumferential secondary groove 15 to the maximum width WB of the center blocks 20 in the tire width direction so that $0.015 \leq P4/WB \leq 0.045$ and setting the ratio P4/P3 of the groove width P4 of the circumferential secondary groove 15 to the groove width P3 of the center lug grooves 14 so that $0.50 \leq P4/P3 \leq 1.00$, a reduction in stone rejecting characteristics can be suppressed and heat build-up resistance performance can be increased.

Furthermore, by providing the circumferential main grooves 11A, 11B with the raised bottom portion 11c, rigidity of the tread portion 2 can be increased and wear resistance and heat resistance can be increased.

Figure 4:
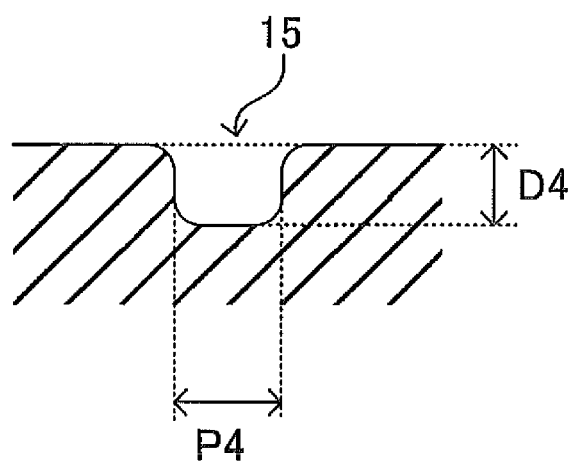
FIG. 4 is a cross-sectional view taken along the line IV-IV of FIG. 2.
Figure 5:
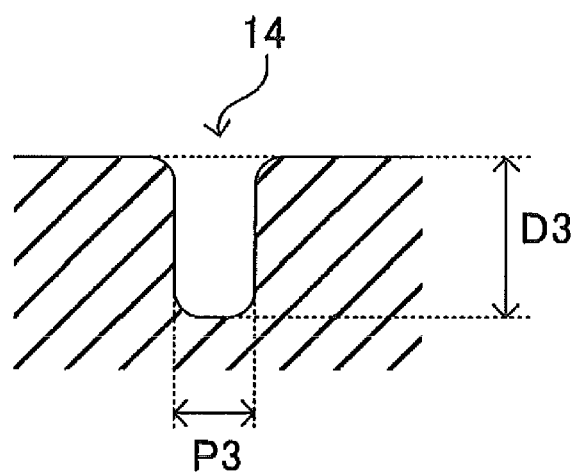
FIG. 5 is a cross-sectional view taken along line V-V of the arrows in FIG. 2.

FIG. 4 is a cross-sectional view of the circumferential secondary groove 15. FIG. 5 is a cross-sectional view of the center lug groove 14. By setting the relationship D4/D3 between the maximum groove depth D4 of the circumferential secondary groove 15 as illustrated in FIG. 4 and the maximum groove depth D3 of the center lug grooves 14 as illustrated in FIG. 5 such that $0.45 \leq D4/D3 \leq 0.85$, a reduction in stone rejecting characteristics can be suppressed and heat build-up resistance performance can be increased.

Additionally, by setting the ratio B/WB of the maximum distance B in the tire width direction between the first groove turning portion 14a and the second groove turning portion 14b to the maximum width WB of the center blocks in the tire width direction to $0.10 \leq B/WB \leq 0.50$, a reduction in stone rejecting characteristics can be suppressed and heat build-up resistance performance can be increased.

By the corner portions formed in the center blocks 20 corresponding to the circumferential main grooves 11A, 11B having an obtuse angle, rigidity of the center blocks 20 can be increased.

Working Examples, Conventional Example, Comparative Examples

To examine the effects of a tire according to the present embodiment, test tires with varying tread patterns were manufactured and wear resistance performance and heat build-up resistance performance of each were tested. The size of the test tires was 46/90R57.

Evaluation of Heat Build-Up Resistance Performance

Indoor drum testing was performed on the test tires after being mounted to TRA specified rims with a rim size of 29.00-6.0, inflated to an air pressure of 700 kPa (TRA specified air pressure), and loaded with 110% of the standard maximum load of 63000 kg so as to comply with test conditions. Starting at a speed of 5 km/h, the speed was increased by 1 km/h every 12 hours and the running time up until when the tire failed due to heat build-up was measured.

Heat build-up resistance performance was evaluated with the results being expressed as index values and the running time of the conventional example being defined as 100.

Evaluation of Stone Rejecting Characteristics

The manufactured test tires were mounted on an actual vehicle (200 ton dump truck) and the vehicle was driven back and forth five times over a 30 m area covered with stones with a diameter ranging from 2 mm to 20 mm. Thereafter, the number of stones lodged in the center lug grooves, the circumferential secondary groove, and the circumferential main grooves was counted. The reciprocals of the results were expressed as index values with the reciprocal of the measurement result of the Conventional Example described below being defined as the reference (index value of 100). Larger index values indicate superior stone rejecting characteristics.

Test tires according to the Conventional Example, Comparative Examples 1 to 4, and Working Examples 1 to 19 were manufactured.

Figure 7:
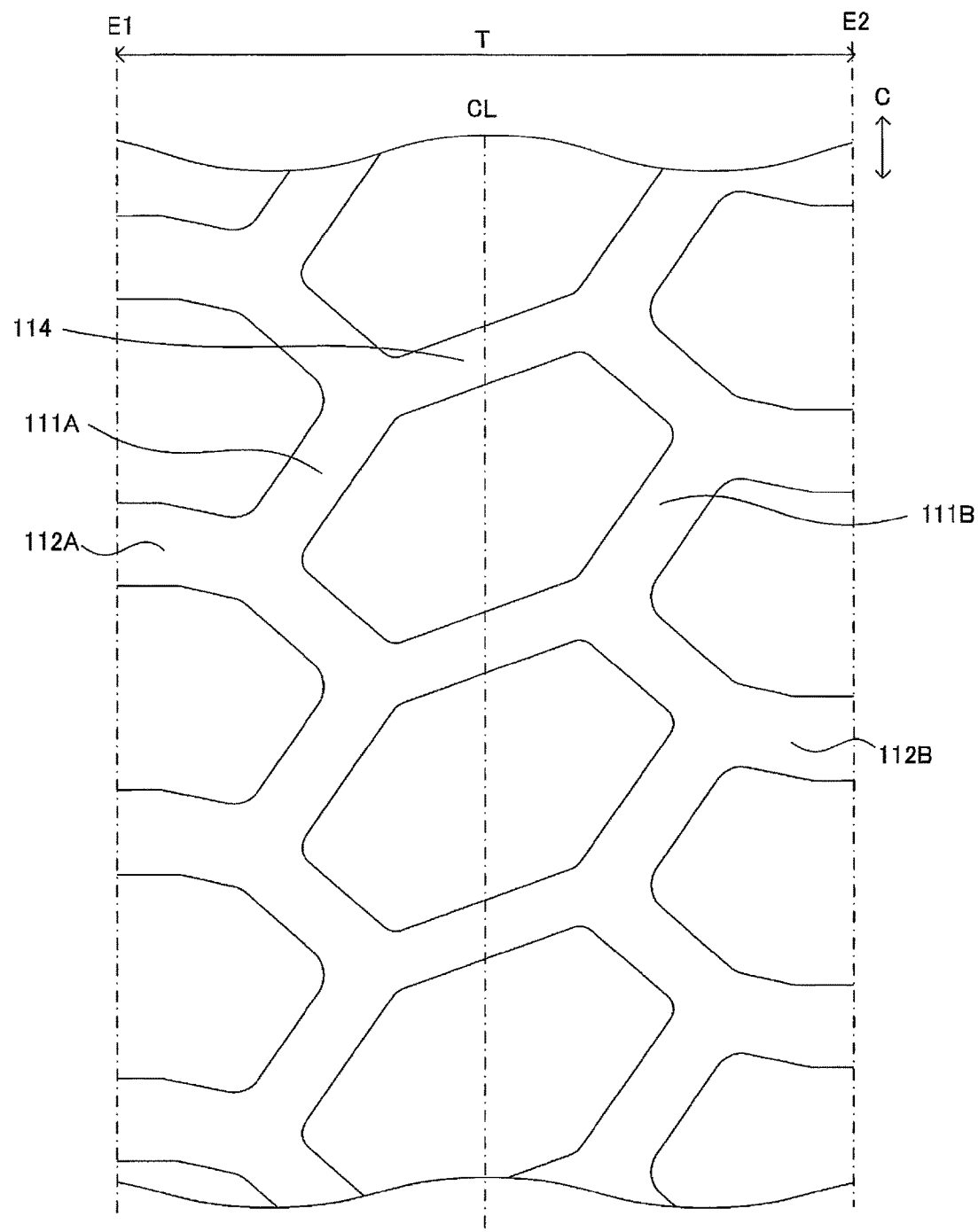
FIG. 7 is a view illustrating a tread pattern of a tire according to a conventional example.

FIG. 7 is a view illustrating a tread pattern of a tire according to a conventional example. The tread pattern illustrated in FIG. 7 is provided with a pair of circumferential main grooves 111A, 111B, shoulder lug grooves 112A, 112B, and center lug grooves 114. The circumferential main grooves 111A, 111B, the shoulder lug grooves 112A, 112B, and the center lug grooves 114 has the same configuration as their counterparts the circumferential main groove 11A, 11B, the shoulder lug grooves 12A, 12B, and the center lug grooves 14. Additionally, the width of the circumferential main grooves 111A, 111B and the shoulder lug grooves 112A, 112B is the same as that of the shoulder lug grooves 12A, 12B. A circumferential secondary groove is not provided in the land portion surrounded by the circumferential main grooves 111A, 111B and the center lug grooves 114.

In the tire of Comparative Example 1, the tread pattern has a configuration including a circumferential secondary groove and center lug grooves without groove turning portions. In the tire of Comparative Example 2, the tread pattern has a configuration including a circumferential secondary groove, and center lug grooves with a single groove turning portion.

In the tire of Working Example 1, the tread pattern is the same as that illustrated in FIG. 2 except that $\theta 3$ is less than $\theta 1$ and $\theta 2$.

In the tire of Comparative Examples 3, 4 and Working Examples 2 to 19, the tread pattern was the same as that illustrated in FIG. 2.

The configuration of the components and the evaluation results for wear resistance and heat build-up resistance performance of the tread patterns are shown in Tables 1 to 3 below. Tires with a score of 105 or greater for heat build-up resistance and 95 or greater for stone rejecting characteristics are understood as being capable of increasing heat build-up resistance while suppressing a reduction in stone rejecting characteristics.

TABLE 1

|  | Conventional Example | Comparative Example | | | |
|---|---|---|---|---|---|
|  |  | 1 | 2 | 3 | 4 |
| Circumferential secondary groove | Absent | Present | Present | Present | Present |
| Groove turning portion in center lug groove | 0 | 0 | 1 | 2 | 2 |
| $\theta 1(=\theta 2)(°)$ | — | 30 | 30 | 30 | 30 |
| $\theta 3(°)$ | 20 | 20 | 20 | 20 | 20 |
| P4/WB | — | 0.013 | 0.013 | 0.013 | 0.048 |
| P4/P3 | — | 0.33 | 0.33 | 0.33 | 1.25 |
| Raised bottom portion | Absent | Absent | Absent | Absent | Absent |
| D2/T | — | — | — | — | — |
| D4/D3 | — | 1.00 | 1.00 | 1.00 | 1.00 |
| B/WB | — | — | — | 0.08 | 0.08 |
| Heat build-up resistance | 100 | 101 | 102 | 103 | 109 |
| Stone rejecting characteristics | 100 | 99 | 98 | 97 | 91 |

|  | Working Example | | | | | |
|---|---|---|---|---|---|---|
|  | 1 | 2 | 3 | 4 | 5 | 6 |
| Circumferential secondary groove | Present | Present | Present | Present | Present | Present |
| Groove turning portion in center lug groove | 2 | 2 | 2 | 2 | 2 | 2 |
| $\theta 1(=\theta 2)(°)$ | 15 | 30 | 30 | 30 | 30 | 30 |
| $\theta 3(°)$ | 20 | 20 | 20 | 20 | 20 | 20 |
| P4/WB | 0.015 | 0.015 | 0.025 | 0.03 | 0.035 | 0.045 |

TABLE 1-continued

| | | | | | | |
|---|---|---|---|---|---|---|
| P4/P3 | 0.5 | 0.5 | 0.65 | 0.76 | 0.85 | 1 |
| Raised bottom portion | Absent | Absent | Absent | Absent | Absent | Absent |
| D2/T | — | — | — | — | — | — |
| D4/D3 | 1.00 | 1.00 | 1.00 | 1.00 | 1.00 | 1.00 |
| B/WB | 0.08 | 0.08 | 0.08 | 0.08 | 0.08 | 0.08 |
| Heat build-up resistance | 105 | 105 | 106 | 106 | 107 | 107 |
| Stone rejecting characteristics | 95 | 97 | 97 | 97 | 96 | 95 |

TABLE 2

| | Working Example | | | | | | |
|---|---|---|---|---|---|---|---|
| | 7 | 8 | 9 | 10 | 11 | 12 | 13 |
| Circumferential secondary groove | Present | Present | Present | Present | Present | Present | Present |
| Groove turning portion in center lug groove | 2 | 2 | 2 | 2 | 2 | 2 | 2 |
| $\theta_1(=\theta_2)(°)$ | 30 | 30 | 30 | 30 | 30 | 30 | 30 |
| $\theta_3(°)$ | 20 | 20 | 20 | 20 | 20 | 20 | 20 |
| P4/WB | 0.03 | 0.03 | 0.03 | 0.03 | 0.03 | 0.03 | 0.03 |
| P4/P3 | 0.76 | 0.76 | 0.76 | 0.76 | 0.76 | 0.76 | 0.76 |
| Raised bottom portion | Present | Present | Present | Present | Present | Present | Present |
| D2/T | 0.04 | 0.04 | 0.04 | 0.04 | 0.04 | 0.04 | 0.04 |
| D4/D3 | 1.00 | 0.38 | 0.45 | 0.55 | 0.62 | 0.75 | 0.85 |
| B/WB | 0.08 | 0.08 | 0.08 | 0.08 | 0.08 | 0.08 | 0.08 |
| Heat build-up resistance | 108 | 106 | 107 | 108 | 108 | 109 | 109 |
| Stone rejecting characteristics | 97 | 99 | 99 | 99 | 99 | 98 | 97 |

TABLE 3

| | Working Example | | | | | |
|---|---|---|---|---|---|---|
| | 14 | 15 | 16 | 17 | 18 | 19 |
| Circumferential secondary groove | Present | Present | Present | Present | Present | Present |
| Groove turning portion in center lug groove | 2 | 2 | 2 | 2 | 2 | 2 |
| $\theta_1(=\theta_2)(°)$ | 30 | 30 | 30 | 30 | 30 | 30 |
| $\theta_3(°)$ | 20 | 20 | 20 | 20 | 20 | 20 |
| P4/WB | 0.03 | 0.03 | 0.03 | 0.03 | 0.03 | 0.03 |
| P4/P3 | 0.76 | 0.76 | 0.76 | 0.76 | 0.76 | 0.76 |
| Raised bottom portion | Present | Present | Present | Present | Present | Present |
| D2/T | 0.04 | 0.04 | 0.04 | 0.04 | 0.04 | 0.04 |
| D4/D3 | 0.62 | 0.62 | 0.62 | 0.62 | 0.62 | 0.62 |
| B/WB | 0.10 | 0.20 | 0.30 | 0.40 | 0.50 | 0.54 |
| Heat build-up resistance | 109 | 110 | 110 | 111 | 111 | 111 |
| Stone rejecting characteristics | 99 | 99 | 99 | 98 | 97 | 96 |

By comparing the Conventional Example and Comparative Example 1, it can be seen that by providing a circumferential secondary groove, heat build-up resistance improves but stone rejecting characteristics decrease. By comparing Comparative Examples 1 to 3, it can be seen that configurations with two groove turning portions in the center lug grooves (Comparative Example 3) have higher heat build-up resistance (lower stone rejecting performance) than configurations with no groove turning portions (Comparative Example 1) or one groove turning portion (Comparative Example 2) in the center lug grooves.

By comparing Working Example 1 and 2, it can be seen that Working Example 2 in which $\theta_1$ and $\theta_2$ are greater than $\theta_3$ has better heat resistance and stone rejecting characteristics than Working Example 1 in which $\theta_1$ and $\theta_2$ are less than $\theta_3$.

By comparing Comparative Examples 3, 4 and Working Examples 1 to 6, it can be seen that in configurations in which P4/WB ranges from 0.015 to 0.045 and P4/P3 ranges from 0.50 to 1.00, heat build-up resistance can be increased while suppressing a reduction in stone rejecting characteristics. Additionally, it can be seen that in configurations in which P4/WB ranges from 0.025 to 0.035 and P4/P3 ranges from 0.65 to 0.85, heat build-up resistance can be increase while further suppressing a reduction in stone rejecting characteristics.

By comparing Working Example 4 and 7, it can be seen that configurations provided with a raised bottom portion have an even higher heat build-up resistance compared to configurations without a raised bottom portion.

By comparing Working Examples 7 to 13, it can be seen that configurations in which D4/D3 ranges from 0.45 to 0.85 have even higher stone rejecting characteristics while maintaining heat build-up resistance. In particular, it can be seen that configurations in which D4/D3 ranges from 0.55 to 0.75 have even higher stone rejecting characteristics while further maintaining heat build-up resistance.

By comparing Working Examples 11 and 14 to 19, it can be seen that configurations in which B/WB ranges from 0.1 to 0.5 have even higher stone rejecting characteristics while further maintaining heat build-up resistance. In configurations in which B/WB ranges from 0.2 to 0.4, this effect is more evident.

This clearly demonstrates the effect of the present embodiment.

The foregoing has been a detailed description of the pneumatic tire of the present technology. However, the present technology is not limited to the above embodiments, and may be improved or modified in various ways within the scope of the present technology.

The invention claimed is:

1. A heavy duty pneumatic tire comprising
a tread portion provided with a tread pattern,
the tread pattern comprising:
a plurality of center lug grooves disposed at intervals in a tire circumferential direction that extend crossing a tire equator line, the plurality of center lug grooves each comprising:
a first groove turning portion that turns with a bent shape or a curved shape and a first end, the first groove turning portion and the first end being located in a half-tread region that is on a first side of the tire equator line in a tire width direction, and
a second groove turning portion that turns with a bent shape or a curved shape and a second end, the second groove turning portion and the second end being located in a half-tread region on a second side in the tire width direction;
a plurality of shoulder lug grooves disposed in the intervals in the tire circumferential direction between the plurality of center lug grooves in both of the half-tread regions that extend outward in the tire width direction, the plurality of shoulder lug grooves each comprising:
an outer end in the tire width direction that opens to a ground contact edge on each of opposite sides in the tire width direction, and
an inner end in the tire width direction located on an outside of a position in the tire width direction of the first end or the second end in the tire width direction;
a pair of circumferential main grooves disposed in the respective half-tread regions that extend around an entire circumference of the pneumatic tire in a wave-like shape with a groove width less than that of the plurality of shoulder lug grooves, the pair of circumferential main grooves alternately connecting the respective first ends or second ends and the inner ends of each of the plurality of shoulder lug grooves in the tire width direction;
a plurality of center blocks arranged in the tire circumferential direction and defined by the plurality of center lug grooves and the pair of circumferential main grooves;
a plurality of shoulder blocks arranged in the tire circumferential direction and defined by the plurality of shoulder lug grooves and the pair of circumferential main grooves; and
a circumferential secondary groove disposed around the entire circumference of the pneumatic tire that intersects the plurality of center lug grooves between the first groove turning portion and the second groove turning portion; wherein
the plurality of center lug grooves each comprises an inside groove portion between the first groove turning portion and the second groove turning portion, and outside groove portions located on outsides of the first groove turning portion and the second groove turning portion in the tire width direction, the inside groove portion being inclined to a third side of the tire circumferential direction when proceeding from the second side in the tire width direction to the first side in the tire width direction, and the outside groove portions being inclined to a fourth side opposite to the third side of the tire circumferential direction when proceeding from the second side in the tire width direction to the first side in the tire width direction;
a relationships $0.50 \leq P4/P3 \leq 1.00$ and $0.015 \leq P4/WB \leq 0.045$ are satisfied, where P3 is a groove width of the plurality of center lug grooves, P4 is a groove width of the circumferential secondary groove, and WB is a maximum width of the plurality of center blocks in the tire width direction;
a relationship $0.55 \leq D4/D3 \leq 0.85$ is satisfied, where D3 is a maximum groove depth of the plurality of center lug grooves and D4 is a maximum groove depth of the circumferential secondary groove; and
a relationship $0.10 \leq B/WB \leq 0.30$ is satisfied, where B is a maximum distance in the tire width direction between the first groove turning portion and the second groove turning portion.

2. The heavy duty pneumatic tire according to claim 1, further comprising a raised bottom portion in each of the pair of circumferential main grooves where a groove becomes partially shallower.

3. The heavy duty pneumatic tire according to claim 2, wherein a relationship $D2/T<0.05$ is satisfied, where D2 is a groove depth of the raised bottom portion and T is a ground contact width of the tread portion in the tire width direction.

4. The heavy duty pneumatic tire according to claim 1, wherein corner portions with an obtuse angle are formed in the plurality of center blocks corresponding to the pair of circumferential main grooves.

5. The heavy duty pneumatic tire according to claim 1, wherein a groove width P3 of the plurality of center lug grooves and a groove width P4 of the circumferential secondary groove range from 7 mm to 20 mm.

6. The heavy duty pneumatic tire according to claim 1, wherein the heavy duty pneumatic tire is mounted on a construction vehicle or an industrial vehicle.

7. The heavy duty pneumatic tire according to claim 1, wherein
the first groove turning portion disposed on the first side bends or curves protruding out toward a third side in the tire circumferential direction,
the second groove turning portion disposed on the second side bends or curves protruding out toward a fourth side opposite the third side in the tire circumferential direction; and
an inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the plurality of center lug grooves, the straight lines following center positions in a groove width direction of the center lug grooves.

8. The heavy duty pneumatic tire according to claim 1, wherein a relationship $0.55 \leq D4/D3 \leq 0.75$ is satisfied, where D3 is a maximum groove depth of the plurality of center lug grooves and D4 is a maximum groove depth of the circumferential secondary groove.

9. The heavy duty pneumatic tire according to claim 8, wherein a relationship $0.20 \leq B/WB \leq 0.30$ is satisfied, where B is a maximum distance in the tire width direction between the first groove turning portion and the second groove turning portion.

10. The heavy duty pneumatic tire according to claim 9, wherein corner portions with an obtuse angle are formed in the plurality of center blocks corresponding to the pair of circumferential main grooves.

11. The heavy duty pneumatic tire according to claim 10, wherein a groove width P3 of the plurality of center lug grooves and a groove width P4 of the circumferential secondary groove range from 7 mm to 20 mm.

12. The heavy duty pneumatic tire according to claim 11, wherein the heavy duty pneumatic tire is mounted on a construction vehicle or an industrial vehicle.

13. The heavy duty pneumatic tire according to claim 12, wherein
    the first groove turning portion disposed on the first side bends or curves protruding out toward a third side in the tire circumferential direction,
    the second groove turning portion disposed on the second side bends or curves protruding out toward a fourth side opposite the third side in the tire circumferential direction; and
    an inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the plurality of center lug grooves, the straight lines following center positions in a groove width direction of the center lug grooves.

14. The heavy duty pneumatic tire according to claim 1, wherein $0.50 \leq P4/P3 \leq 0.95$.

* * * * *